Aug. 2, 1966 W. T. EPPLER 3,264,559
APPARATUS FOR MEASURING THE PERCENT CHARGE IN LENGTH OF
STRIP MATERIAL AFTER FORMATION ABOUT A CABLE CORE
Filed Jan. 29, 1963 2 Sheets-Sheet 1
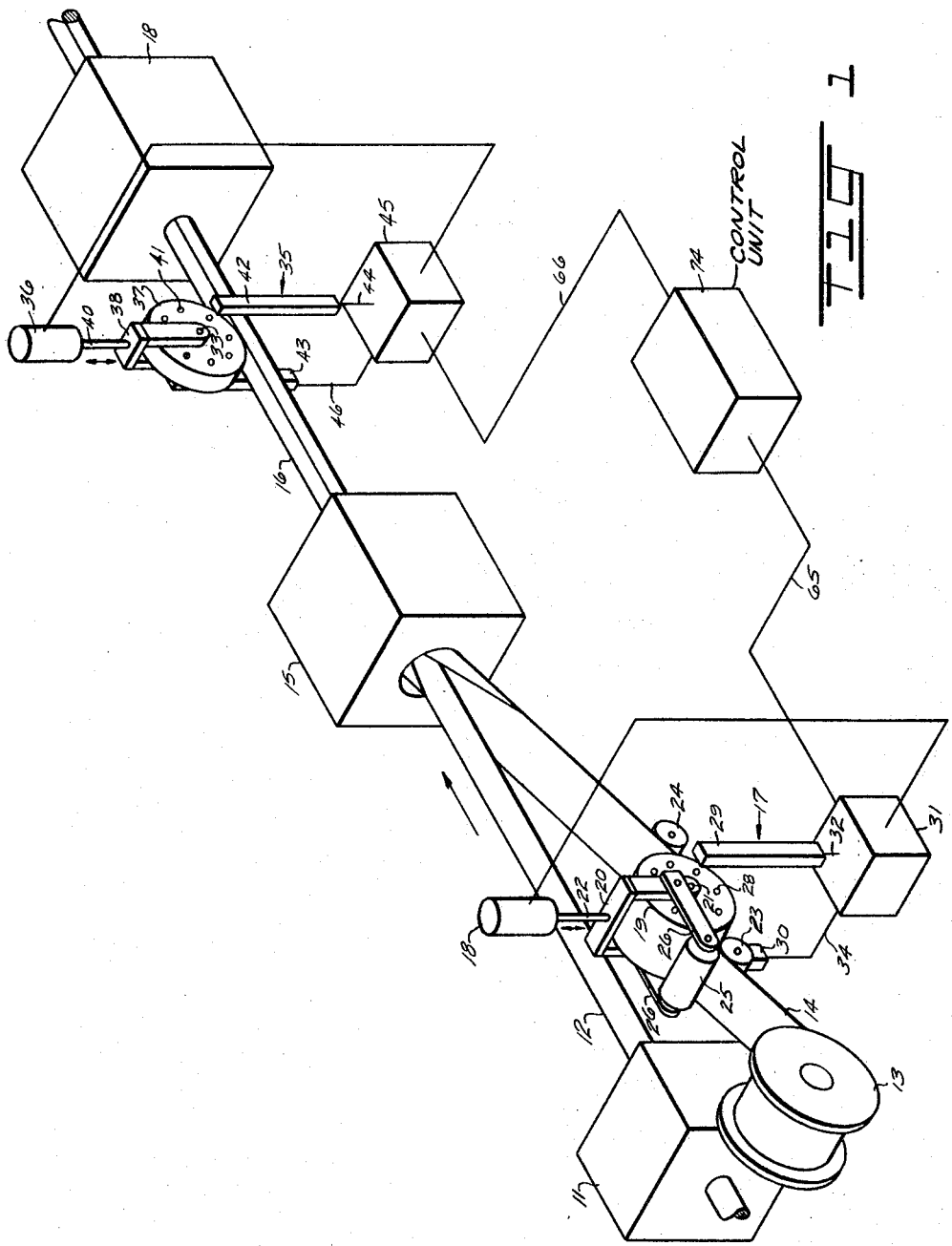
INVENTOR
W. T. EPPLER
BY
ATTORNEY

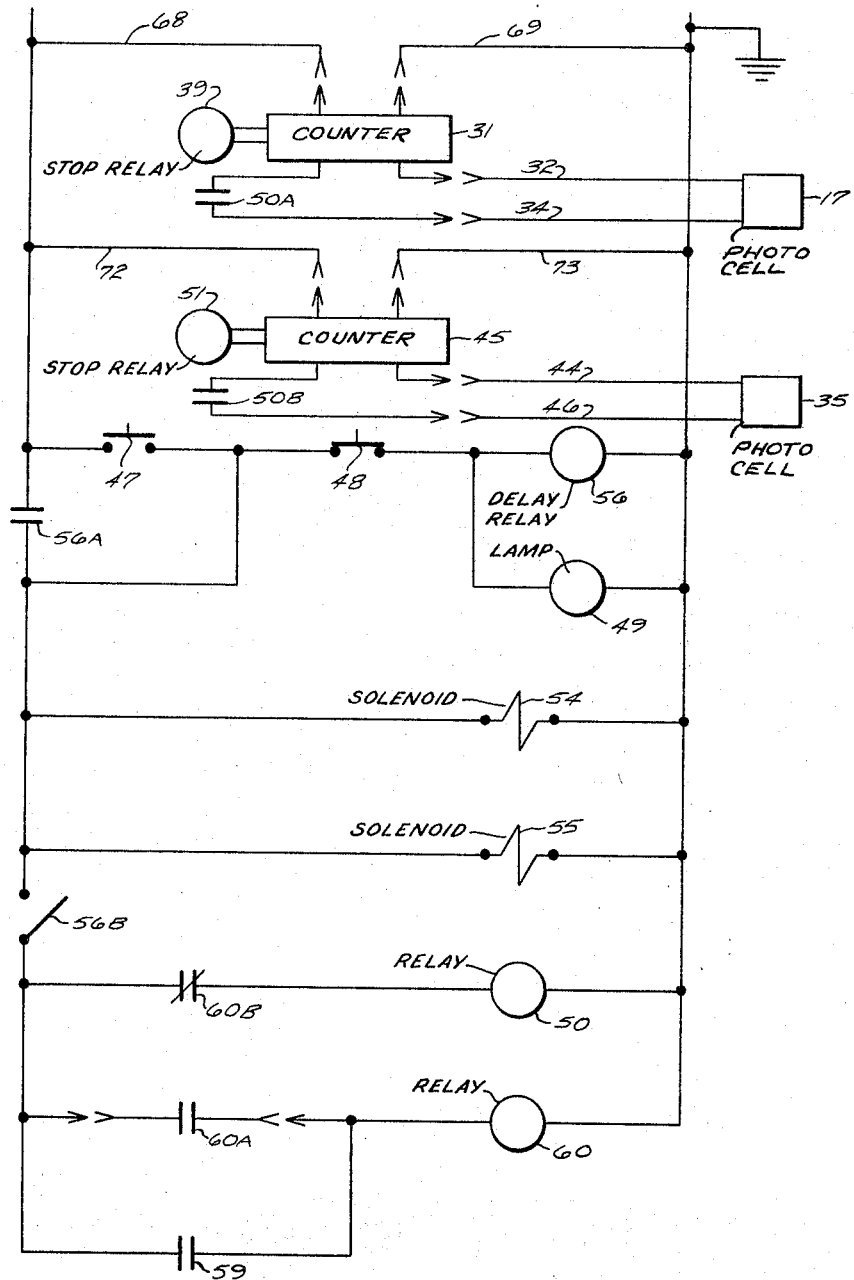

3,264,559
APPARATUS FOR MEASURING THE PERCENT CHANGE IN LENGTH OF STRIP MATERIAL AFTER FORMATION ABOUT A CABLE CORE
Walter T. Eppler, Cranford, N.J., assignor to Western Electric Company, Incorporated, New York, N.Y., a corporation of New York
Filed Jan. 29, 1963, Ser. No. 254,664
2 Claims. (Cl. 324—69)

This invention relates to an apparatus for accurately measuring the percent change in length of a moving, continuous strip of material and, more particularly, to the percent of contraction of metal strips or tapes which are corrugated and the percent of elongation of metal strips or tapes which are stretched during wrapping about a cable core to form a protective sheath.

In the manufacture of telephone cable, the strip employed to form a protective sheath may be corrugated just before being wrapped on the core in order to increase its flexibility or it may be wrapped on the core in flat form. When the strip is corrugated, a predetermined amount of contraction is required, but where the strip is applied to the core in flat form, the elongation from the wrapping operation must be kept to a minimum. The strip in its original state as fed to the wrapping mechanism can be referred to as "pre-wrapping strip" while the strip encasing the cable core as a sheath can be referred to as "post-wrapping strip." Whether contracted in length by mechanical working prior to or elongated in the process of being wrapped about a cable core, the change in unit length of the strip, measured in percent must be accurately determined. Either the pre-wrapping length or the post-wrapping length can be the standard for comparing the percent of change.

Prior to this invention there was no reliable and practical way of determining the extent of elongation or contraction during the manufacturing operation. Available mechanical counters, besides requiring calculation of the percent change in length and being difficult to read at two remote locations, were often inaccurate because of slippage resulting from drag. For these reasons quality control could only be achieved by periodically taking a sample from the end of a manufactured cable and destructively analyzing it by laboratory techniques. Unfortunately, such a sample not only failed to be representative of the entire cable length, but if the required quality was not met, the entire production run had to be scrapped. In addition, a long time delay existed between completion of production and laboratory analysis.

An object of the present invention is an apparatus of improved construction for accurately measuring the percent of change in length of a moving, continuous strip of material.

Another object of the invention is an apparatus of improved construction for accurately determining the percent of change in length of a moving, continuous metal strip caused by mechanical working.

According to these and other objects of the invention, a retractable pre-wrapping counter wheel and a retractable post-wrapping counter wheel engage the moving strip. A circumferential and symmetrical array of bores extend through each wheel parallel to its axis. Associated with each wheel is a photoelectric unit having a light beam source on one side and a receiver on the other side of the wheel. The rotation of each wheel results in electric pulses being generated by the light beam periodically passing through each of the bores in succession and impinging on the associated receiver. As both wheels are of equal diameter and have correspondingly dimensioned arrays of bores, the pulse rate is proportional to the unit length of the strip passing the location of the particular counter wheel.

If the length of the pre-wrapping strip is selected as the reference length for determining the percent of change, the pulses generated by the pre-wrapping wheel and photoelectric unit associated therewith are recorded in a pre-set counter. The pulses from the other wheel and photoelectric unit are recorded by a measuring counter. Conversely, if the post-wrapping strip is selected as the reference length, the pulses generated by that wheel and photoelectric unit are recorded in the pre-set counter and the measuring counter records the pulses from the pre-wrapping wheel and unit. The pre-set counter is preferably set to measure a number of linear units equal to ten raised to the power of a positive integer, such as 10, 100 or 1000.

In operation, two solenoids of the apparatus are initially energized, each of which actuates a fluid cylinder which, in turn, places both counter wheels in contact with the strip. Simultaneously with the energizing of the solenoids, a time delay relay is energized. At the conclusion of the time delay period during which the wheels are able to reach operational speed, the time delay relay starts both counters. When the pre-set counter reaches its predetermined number of units, it shuts off both counters and the number of measured units are read as a percent of the number of pre-set units on a visual recording meter in the measuring counter. For example, where the pre-set number of units is 1000, which is the preferable selection, and the measuring counter records 800, this is read directly as 80 percent of the pre-set length. A restoring switch thereafter causes all relays and contacts to be deactivated and the wheels to be disengaged from the strip.

Other objects and advantages will be apparent from the following detailed description when considered in conjunction with the accompanying drawings, wherein:

FIG. 1 is a perspective view of the apparatus with the control circuit shown in block diagram form; and FIG. 2 is a schematic view of the wiring diagram.

Referring now to the drawings, and particularly to FIG. 1 thereof, there is shown a cable core source 11, for example a wire twister, feeding a cable core 12 in the direction indicated. A reel 13 supplies a pre-wrapping strip 14 of mechanically workable material, such as aluminum or steel, which is wrapped about the generally round cable core 12 by any known, conventional wrapping mechanism 15. The cable core 12 encased with the post-wrapping strip 16 is fed to a receiving unit 18.

A pre-wrapping counter wheel 19, located adjacent the pre-wrappinig strip 14, is supported by an overhead frame 20 and rotates about an axis 21. The frame 20 is connected by a rod 22 to a pre-wrapping fluid cylinder 18 which serves as the power source for retracting the pre-wrapping counter wheel 19 when not in use. When wheel 19 is lowered to be in contact with the pre-wrapping strip 14, the latter is guided around the wheel by a first guide roller 23 and a second guide roller 24. A third guide roller 25 is held by a subframe 26 pivotably connected to the mounting frame 20. The large circumferential area of contact thus obtained between the pre-wrapping strip 14 and the pre-wrapping counter wheel 19 prevents error from slippage.

A circumferential array of evenly spaced bores 28 extend through and parallel with the axis of the pre-wrapping counter wheel 19. A pre-wrapping photoelectric unit, shown generally by reference numeral 17, includes a light source 29 and a receiver 30, only partially seen, located on opposite sides of the counter wheel 19. Photoelectric unit 17 passes a beam through each of the bores 28 in succession as the wheel rotates. The periodic interruption of the photoelectric beam by the rotation of the pre-wrapping counter wheel 19 generates electric pulses which are transmitted through the circuit including source lead 32 and receiver lead 34 to the pre-wrapping counter 31. The unit length of the pre-wrapping strip 14 to be measured is thus made proportional to and determined by the rate at which electric pulses are recorded in the pre-wrapping counter 31. Other embodiments of the wheel 19 (as well as wheel 37 described herein below) which permit alternate passing and blocking of a photoelectric beam, such as a wheel constructed of a pattern of transparent and opaque segments, could of course also be utilized.

A post-wrapping counter wheel 37, basically similar to the pre-wrapping counter wheel 19, is located adjacent the post-wrapping strip 16. Wheel 37 is supported by a frame 38 and rotates about an axis 33. The frame 38 is connected by a rod 40 to a post-wrapping fluid cylinder 36 which serves as the power source for retracting the post-wrapping counter wheel 37 when not in use.

A circumferential array of evenly spaced bores 41 extend through and parallel with the axis of the post-wrapping counter wheel 37. A post-wrapping photoelectric unit, shown generally by reference numeral 35, includes a light source 42 and a receiver 43, only partially seen, located on opposite sides of the counter wheel 37. Photoelectric unit 35 passes a beam through each of the bores 41 in succession as the wheel rotates. The periodic interruption of the photoelectric beam by the rotation of the post-wrapping counter wheel 37 generates electric pulses which are transmitted through the circuit including source lead 44 and receiver lead 46 to the post-wrapping counter 45. The unit length of the post-wrapping strip 16 to be measured is thus made proportional to and determined by the rate at which photoelectric pulses are recorded in the post-wrapping counter 45.

A conduit 65 contains two leads 68, 69, seen in FIG. 2, connecting the pre-wrapping counter 31 to the control unit 74. A conduit 66 contains two leads 72, 73, seen in FIG. 2, connecting the post-wrapping counter 45 to the control unit 74.

Referring particularly to FIG. 2, there is shown a schematic view of the control circuit. Operation of the apparatus to measure present change in unit length of strip material is started by closing a start switch 47. This simultaneously illuminates a signal light 49 and energizes a pre-wrapping solenoid valve 54, a post-wrapping solenoid valve 55, and a time delay relay 56 which immediately closes contact 56–A allowing the start switch 47 to be released. The pre-wrapping solenoid valve 54 operates the pre-wrapping fluid cylinder 18 of FIG. 1 to place the pre-wrapping counter wheel 19 in contact with the pre-wrapping strip 14. The post-wrapping solenoid valve 55 likewise operates the post-wrapping fluid cylinder 36 to place the post-wrapping counter wheel wheel 37 in contact with the post-wrapping strip 16.

After a sufficient period of time has elapsed for both counter wheels 19, 37 to reach operating speed, the time delay relay 56 closes a start contact 56–B which energizes a start relay 50. Relay 50 closes a pre-wrapping counter contact 50–A and a post-wrapping counter contact 50–B. Contact 50–A completes the necessary electrical continuity between counter 31 and photoelectric unit 17, through leads 32, 34, and contact 50–B similarly completes the necessary electrical continuity between the counter 45 and the photoelectric unit 35, through leads 44, 46, as required to start a measuring operation. Either of the two counters 31, 45 can be used as the pre-set counter depending upon which strip length is being used as the reference standard.

In a wrapping operation as shown in FIG. 1, it is preferable to use the pre-wrapping counter 31 as the pre-set counter. When the pre-set counter reaches its present count, preferably 1000 units, a counter stop relay 39 or a counter stop relay 51, depending on which counter is used as the pre-set counter, is energized which closes stop contact 59 in the control circuit of FIG. 2, thereby energizing a closing relay 60 which, in turn, closes a relay contact 60–A and opens a break circuit contact 60–B. The opening of contact 60–B de-energizes the start relay 50 and opens the pre-wrapping counter contact 50–A and the post-wrapping counter contact 50–B. By opening the release switch 48, all relays and contacts are deactivated and the solenoid valves 54, 55 de-energized, thereby retracting the counter wheels 19, 37. A new cycle can be started by simply closing the start switch 47 after the release switch 48 has been closed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for measuring the percent change in length of a moving continuous strip of material resulting from forming the strip about a cable core by means of a forming device comprising:

a first photoelectric device located in advance of the forming device and including a light source generating a beam and a receiver on which the beam periodically impinges, a first counter wheel positioned intermediate the source and the receiver and movable into contact with the strip, said wheel including a circular array of openings which periodically pass said beam to the receiver as the wheel rotates, said beam thereby generating pulses at a rate proportional to the linear rate of movement of the strip prior to the formation of the strip about the cable core, a first counter for measuring the number of pulses generated by the first photoelectric device, a second photoelectric device located beyond the forming device including a light source for generating a beam and a receiver on which the beam periodically impinges, a second counter wheel positioned intermediate the source and the receiver and movable into contact with the strip after it has been formed about the core, said wheel including a circular array of openings which periodically pass said beam to the receiver as the wheel rotates, said beam thereby generating pulses at a rate proportional to the linear rate of movement of the strip formed about the cable core, a second counter for measuring the number of pulses generated by the second photoelectric device, and means for moving the counter wheels into contact and out of contact with the strip, circuit means including:
  means for operating the moving means to move the counter wheels into contact with the strip at the start of a measuring operation,
  time delay means for simultaneously connecting the counters to their respective photoelectric devices after a time interval during which the counter wheels reach their operating speed, and
  means for simultaneously disconnecting both counters from their respective photoelectric devices after one of the counters reaches a count equal to ten raised to a positive integral power.

2. Apparatus according to claim 1 wherein:
the means for moving the counter wheels comprises a pair of solenoids, the time delay means comprises a time delay relay and the disconnecting means comprises a stop relay.

References Cited by the Examiner

UNITED STATES PATENTS

| | | | |
|---|---|---|---|
| 2,352,082 | 6/1944 | DeRosa | 324—70 |
| 2,437,048 | 3/1948 | Salles | 324—69 |
| 2,852,195 | 9/1958 | Coleman et al. | 235—103.5 |
| 2,915,703 | 12/1959 | Kessler | 324—69 |
| 2,982,158 | 5/1961 | Orbom | 235—103.5 |
| 2,989,690 | 6/1961 | Cook | 324—69 |

WALTER L. CARLSON, *Primary Examiner.*

FREDERICK M. STRADER, *Examiner.*

C. W. HOFFMAN, M. J. LYNCH, *Assistant Examiners.*